United States Patent [19]

Siwek et al.

[11] Patent Number: 5,183,137
[45] Date of Patent: Feb. 2, 1993

[54] DUAL-RATE SURFACE EFFECT DAMPERS

[75] Inventors: C. Kenneth Siwek, Erie; Wallace C. Flower, McKean; Gene D. Garn, Erie, all of Pa.

[73] Assignee: Lord Corporation, Erie, Pa.

[21] Appl. No.: 811,758

[22] Filed: Dec. 20, 1991

[51] Int. Cl.$^5$ .................................................. F16F 7/08
[52] U.S. Cl. ................................... 188/381; 188/129; 188/268; 188/382; 267/134; 267/182
[58] Field of Search ............... 188/381, 129, 382, 268, 188/312, 378–380, 134; 267/201, 200, 195, 153, 141, 140.1 R, 292, 134, 182, 196, 201, 214, 219, 136

[56] References Cited

U.S. PATENT DOCUMENTS

| | | | |
|---|---|---|---|
| 3,232,597 | 2/1966 | Gaydecki | 267/8 |
| 3,583,530 | 6/1971 | DeVemme | 188/1 |
| 3,968,976 | 7/1976 | Sievenpiper | 280/709 |
| 4,085,832 | 4/1978 | Gaines et al. | 188/268 |
| 4,158,403 | 6/1979 | Peter | 188/1 C |
| 4,182,441 | 1/1980 | Strong et al. | 188/312 |
| 4,630,807 | 12/1986 | Gaudiau | 267/140.1 |
| 4,765,444 | 8/1988 | Bauer et al. | 188/381 X |
| 4,964,516 | 10/1990 | Thorn | 267/141 X |
| 5,085,297 | 2/1992 | Bauer et al. | 188/381 X |

OTHER PUBLICATIONS

Bhushan, Bharat & B. K. Gupta, "Handbook of Tribology", ©1991, McGraw-Hill, pp. 5.12–5.15, 5.21, 5.22, 5.25, 5.29, 5.32–5.36.

*Primary Examiner*—Douglas C. Butler
*Attorney, Agent, or Firm*—Richard K. Thomson; James W. Wright

[57] ABSTRACT

A dual-rate surface effect damper with extended useful life. The dual rate is provided by two cylindrical liners which have different inner diameters which engage a damping piston having protrusions which have an interference fit with the liner. Features which extended life include heat dissipative elements such as internal and external fins, a convective heat transfer path for cooling air through the piston and a lubricant of $MoS_2$ dispersed in a Teflon ®-filled flurosilicone. Maintaining the temperature of the elastomer below about 200° F. (93.3° C.) is critical to avoiding thermal breakdown. In addition, the elastomer and metallic surfaces can undergo a surface treatment to reduce their tendency to abraid and to cause abrasion, respectively.

17 Claims, 3 Drawing Sheets

DUAL-RATE SURFACE EFFECT DAMPERS

FIELD OF THE INVENTION

The present invention relates to improvements in dampers. More specifically, this invention is directed to dampers which create forces having both a hysteretic component and a friction component identified herein as surface effect dampers.

BACKGROUND AND SUMMARY OF THE INVENTION

The invention described and claimed herein is related to the invention set forth in U.S. patent application Ser. No. 07/812,192 filed contemporaneously herewith on Dec. 20, 1991, entitled "Surface Effect Dampers", which is hereby incorporated by reference.

One of the earliest patents relating to dampers employing hysteresis damping, that is the dissipation of translational energy by working of an elastomeric member, in U.S. Pat. No. 3,232,597 to Gaydecki. As a way of achieving a practical wearlife for his damper, Gaydecki sought to eliminate or, at least, minimize the frictional force component developed between the elements of his damper.

As described in the aboveidentified related application, eliminating totally the friction component of damping places severe limits upon the damper's design because a significant potential damping force has been eliminated. The approach taken in the aforementioned application and by Applicants herein, is to take advantage of the damping force available while minimizing the damage friction can produce.

For certain applications, it is desirable to produce one level of damping under certain circumstances and a second level of damping under other circumstances. One such application is in the area of railcar dampers. It is desirable to produce different levels of damping force for filled railcars than for empty ones. An increased damping force will be necessary to control the movement of the loaded railcars.

This invention provides a dual-rate surface effect damper for such applications. A cylindrical housing has bonded to a portion of its internal periphery a first liner having a first length and a first internal diameter for producing a first surface effect damping force opposing motion of a rubbee piston which has an interference fit with the liner. A second liner having a second length and a second smaller internal diameter is bonded to a second portion of the housing to produce a second greater surface effect damping force opposing motion of the rubbee piston. A third liner is provided between said first and second liner segments providing a smooth transition between the first and second segments.

It is an important aspect of the present invention to control the potentially damaging characteristics of the friction damping force component of the surface effect damper. Several elements are provided to permit this control. First, heat dissipative fins are provided on the external periphery of the housing as is suggested in the contemporaneously filed patent application. Second, cooling is provided internally to the rubbee piston by creating air flow to dissipate heat.

Third, an abrasion resistant elastomer is selected for each of the liner segments, in accordance with the teachings of the companion application. Fourth, the external surface of the rubbing piston is coated with a material to diminish its porosity and, hence, its abrasion producing proclivities. Finally, a lubricant is introduced between the rubbed member and the rubbee member to control the magnitude of the friction component. A lubricant which has been shown to have particularly useful properties in extending the wearlife of the elastomer is a (fluro)silicone lubricant which is filled with Teflon ® particles and has dispersed therein molybdenum disulfide ($MoS_2$). The ratio of filled silicone grease to $MoS_2$ which appears optimum is on the order of 15 to 1, by weight.

Various other features, advantages and characteristics of the present invention will become apparent after a reading of the following invention.

DETAILED DESCRIPTION OF THE PREFERRED EMBODIMENTS

Figures 1, 2:
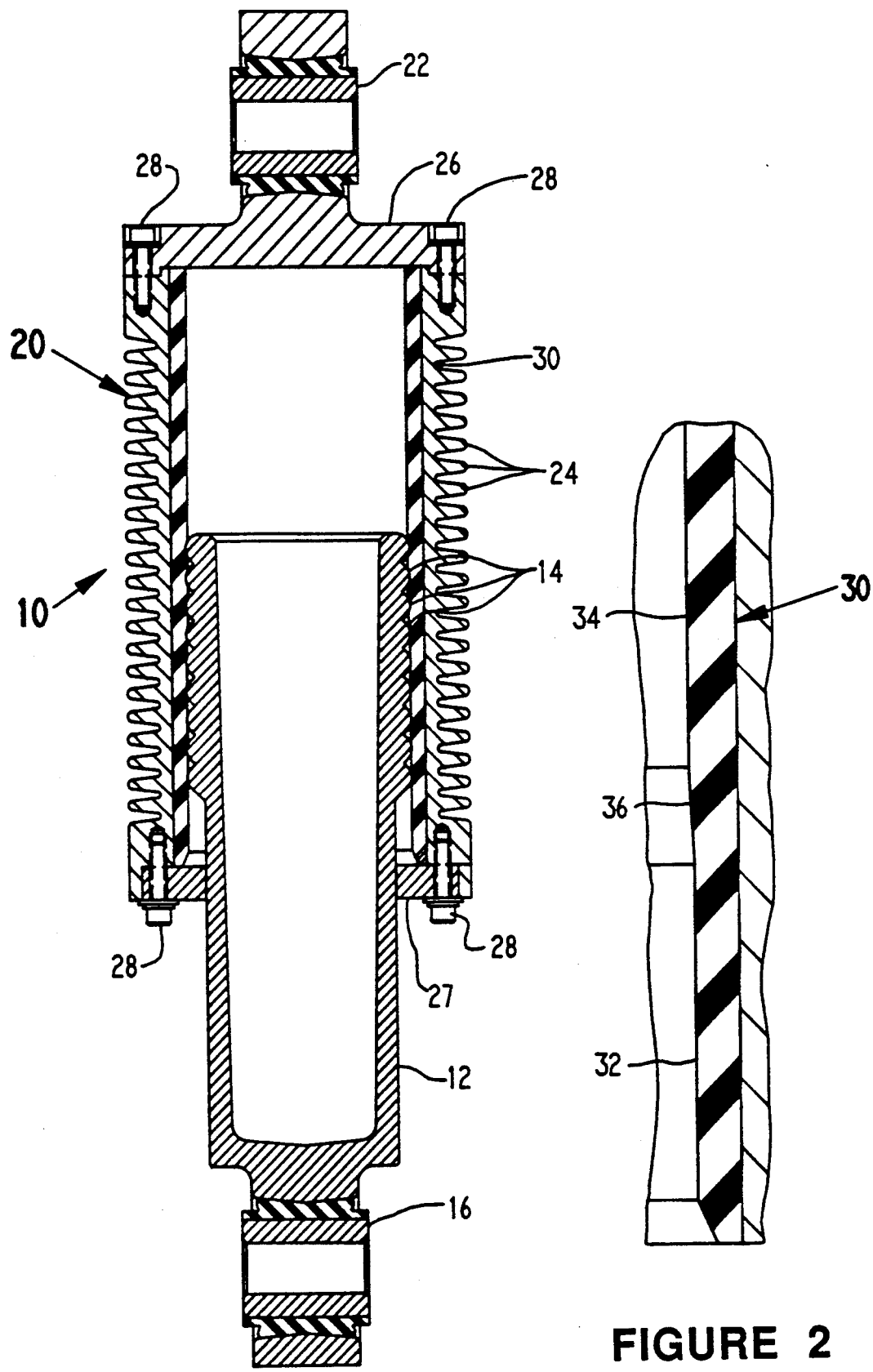
FIG. 1 is a cross-sectional side view of a preferred embodiment of the damper of the present invention.
FIG. 2 is an enlargement of a portion of the housing shown in FIG. 1 showing the transition region.

A first preferred embodiment of the surface effect damper assembly of the present invention is shown generally at 10 in FIG. 1. Damper 10 has two principal components: a piston 12 and a housing 20. One end of piston 12, which is preferably made of a heat conductive metal such as aluminum or an aluminum alloy, has a plurality of annular protrusions 14. Protrusions 14 are identified as the "rubbing" member of the surface effect damper 10 (they effect the working of the elastomer that results in hysteresis damping). In a surface effect device of the type discussed here, the protrusions 14 of the rubbing member also create the frictional component of the damping force by interacting with the rubbed element.

A second end of piston 12 is provided with attachment bushing 16 by which damper assembly 10 can be attached to a first member (not shown). In one possible usage of damper 10, bushing 16 is attached to the undercarriage of a railcar (not shown). Piston 12 is preferably thin walled and hollow for optimum heat dissipation. Various other configurations that can further optimize heat dissipation are described with reference to other embodiments.

Housing 20 also has a bushing 22 on the end opposing the piston 12 for connection to a second member (not shown). In the railcar application, the bushing 22 is connected to the railcar. The external surface of housing 20, which is also preferably aluminum alloy, is equipped with a plurality of annular heat-dissipating fins 24. First end plate 26 is attached by bolts 28 as is second end plate 27. First end plate is preferably of the same heat-dissipative aluminum alloy of which the cylindrical portion of housing 20 is made. Second end plate 27 may similarly be made principally of aluminum alloy but may be provided with a Teflon ® bushing (not shown) to receive piston 12.

Housing 20 has a liner 30 bonded to its internal cylindrical periphery. As best seen in FIG. 2, liner 30 has a stepped configuration. A first elastomeric liner section 32 has a first length having a first substantially uniform inner diameter which is smaller than the outside diameter of protrusions 14 to provide a first level of surface effect damping force. In the railcar application, this level of damping corresponds to the empty railcar usage. A second elastomeric liner section 34 having a second length with a second smaller internal diameter is provided to produce a second higher level of surface effect damping force. In the rail car application, this level of damping will correspond to the fully loaded railcar where greater levels of damping are needed to control the increased load. A third liner segment 36 forms a transition section between the two damping levels afforded by sections 32 and 34. Preferably, the maximum internal dimension of transition section 36 corresponds to the ID of section 32 and found at the lower edge of section 36 (as seen in FIG. 2). The minimum internal dimension of third liner segment 36 corresponds to the ID of section 34 and is found at the uppermost edge of section 36.

The elastomer is selected for a plurality of properties including surface toughness, abrasion resistance, high hysteresis, absence of low temperature stiffness, and stability at temperatures exceeding 200° F. (93.3° C.). Exemplary of elastomers suitable for this application are blends of natural rubber and styrene butadiene and natural rubber and castable urethanes. It will be apparent that one way to vary the damping properties of sections 32 and 34 would be to vary the properties of the sections by using different elastomers.

Another way to optimize the wearlife of the elastomer is to minimize the amount of abrasion between rubbee 14 and rubber liner 30. This can be accomplished by "polishing" the surfaces of both the elastomer of liner 30 and the metal of rubbing member 14. The specifications for the surface finish of the rubber calls for a surface finish of 32 microinches. A similar surface finish is called for on the metal member if a lubricant coating is to be applied such as a Teflon ® coating. One suitable coating, a resin bonded fluoropolymer is sold under the tradename "Emralon 333" by Acheson Colloids. A surface finish of 16 microinches for the metal part is specified if coating is not contemplated.

A most important aspect for controlling the level of frictional damping force and resultant heat developed, is through the use of a suitable lubricant. A number of lubricants have been tried and one that is particularly suitable is a flurosilicone grease filled with Teflon ® particles in which is dispersed 15:1 by weight molydenum disulfide ($MoS_2$). Suitable filled greases include FS3452 and FS1265 available from Dow Corning. Another suitable carrier for the $MoS_2$ is a silicone fluid available from Mobay Chemical having a viscosity of 300K centistokes. Where other lubricants were allowing the friction to cause elastomer deterioration after 120K-150K cycles, this family of lubricants containing molydisulfide extended wearlife to between 400K and 600K cycles. In one set of tests in which the lubricant was combined with the surface coating of the piston mentioned above, 2000K cycles produced no evidence of elastomer wear, while the damper produced an average damping force of 800 pounds.

These tests indicate the importance of keeping the elastomer temperature below a critical deterioration temperature which is somewhat above 200° F. By establishing a design criterion of 200° F. as the maximum temperature the damper assembly 10 is allowed to see, the elastomer is prevented from reaching its thermal breakdown temperature. Accordingly, a second (FIGS. 3 and 4) and third (FIG. 5) embodiment have been developed to ensure that this critical temperature is not reached.

Figures 3, 4:
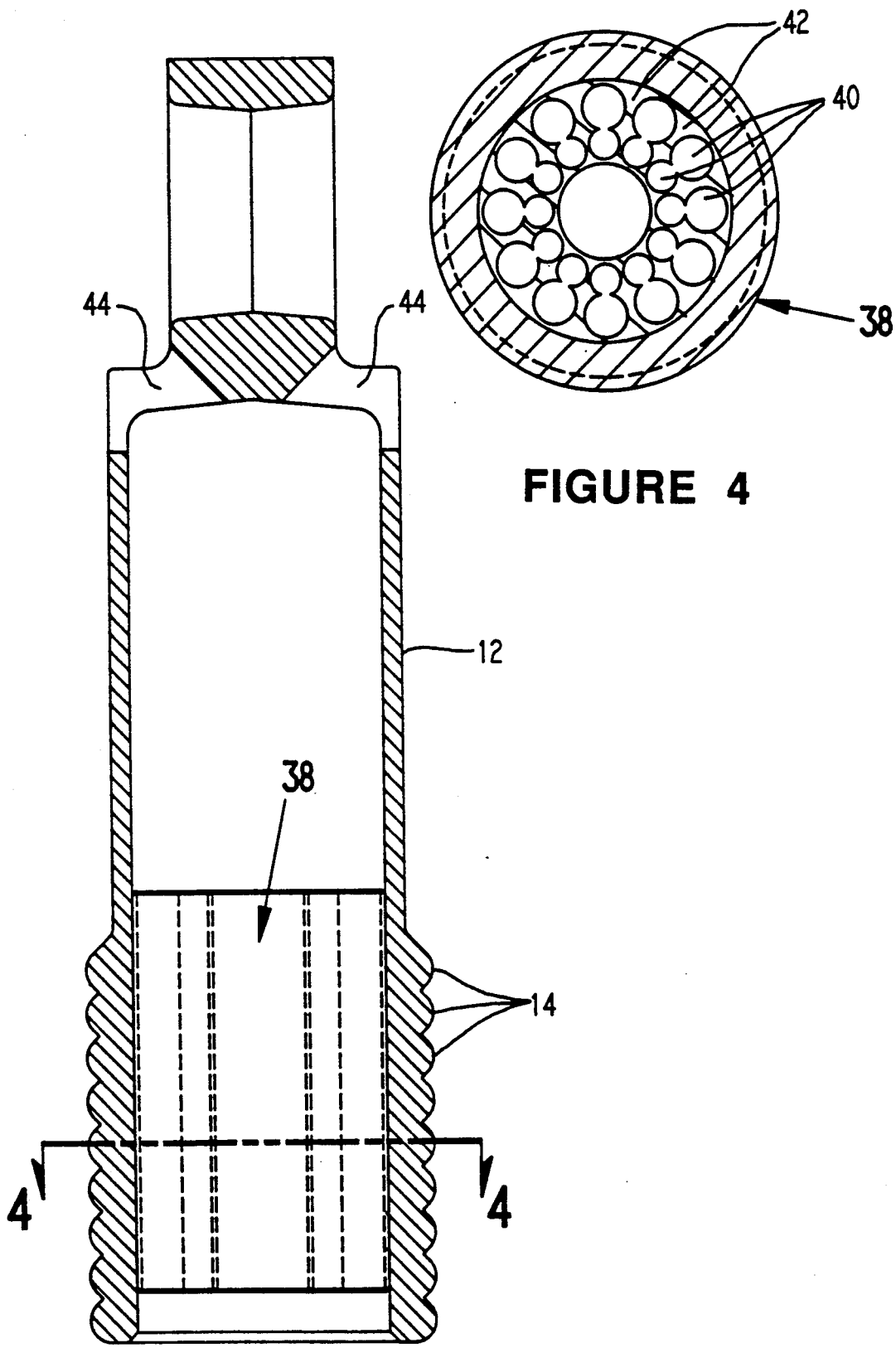
FIG. 3 is a cross-sectional side view of a rubbing member of a second embodiment of the present invention.
FIG. 4 is an end cross-sectional view taken along line 4—4 in FIG. 3.

As seen in FIGS. 3 and 4, piston 12 having protrusions 14 has a convection enhancing insert 38 pressfit into the open end 15. As best seen in FIG. 4, a plurality of axial bores 40 drilled through insert 38 create a plurality of heat dissipating surfaces or fins 42. Two air inlet ports 44 are provided in the base of piston 12 and two exit ports (not shown) are provided in the end of housing 20 opposite piston 12. Insert 38 will serve as a heat sink and air flow through axial bores 40 past fins 42 will enhance conductive and convective heat transfer with the heated air leaving the top of housing 20.

The FIG. 3 embodiment is effective at removing heat. However, for certain applications where unfiltered ambient air may be dust laden, this solution to heat buildup introduces secondary problems. The dust carried into housing 20 will adhere to the lubricant-coated elastomeric liner 30 and cause abrasion. One way to avoid such a problem would be to connect an elastomeric bellows between the end of piston 12 and housing 20 to define an airflow passage which does not include liner 30. Another solution to this problem is depicted in FIG. 5.

Figure 5:
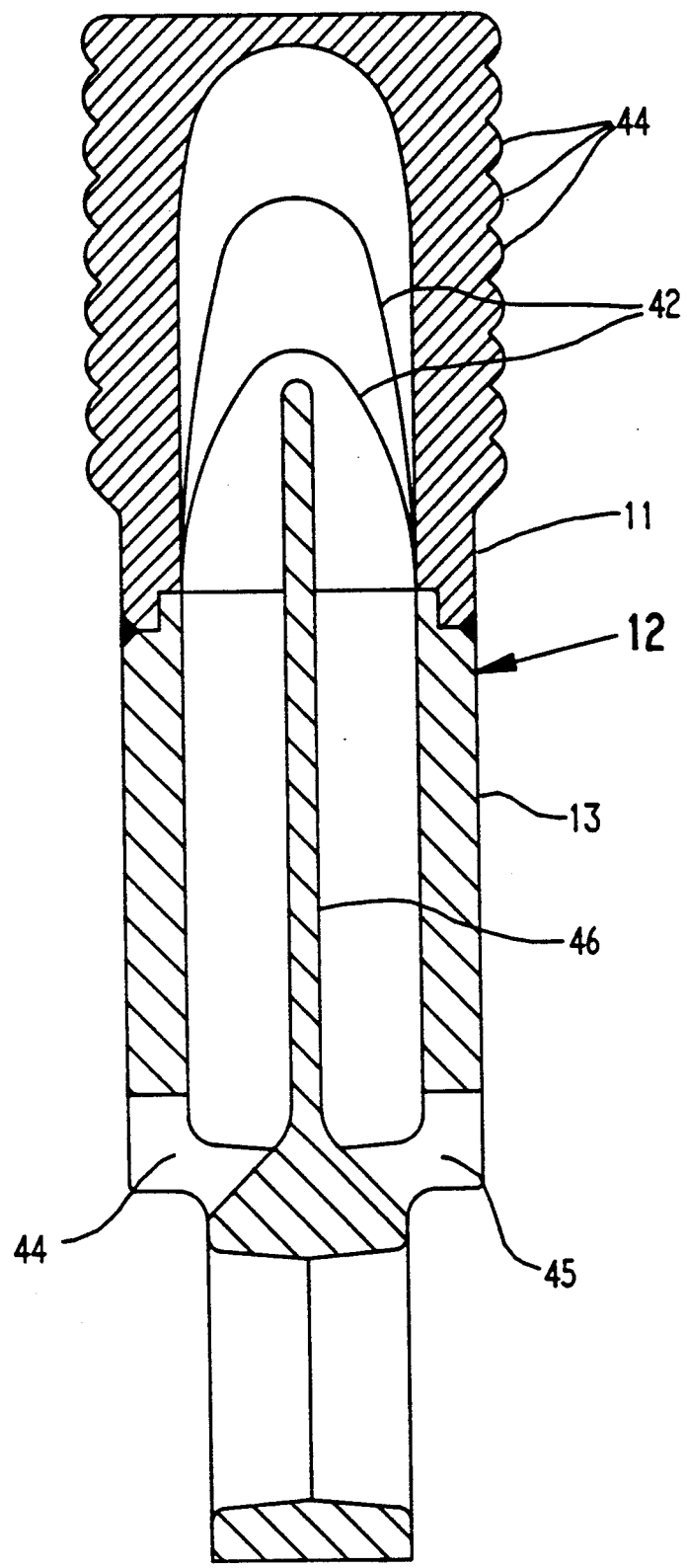
FIG. 5 is a cross-sectional side view of the rubbing member of yet a third embodiment.

The third embodiment of the piston 12 of the damper of the present invention is shown in FIG. 5. In this embodiment, piston 12 is made in two sections 11 and 13 which can be joined as by welding. Sections 11 and 13 facilitate the attachment of baffle 46 within section 13 and a plurality of ribbon-like fins 42 whose ends may be pinched between housing sections 11 and 13. These fins 42 extend only a fraction of the width of housing 20 such that air entering inlet port 44 can freely circulate about fins 42 to accomplish the convective heat transfer. Preferably, inlet port 44 extends in the forward direction such that, when the railcar or other such vehicle is in motion, air will be forced into inlet port 44 as in a ram jet, circulate around baffle 46 past fins 42 and convey the heat out exit port 45. Since the airstream never enters the housing 20, the elastomer of liner 30 is not exposed to any dust it may carry.

It can be appreciated that the present invention comprises an improved surface effect damper 10 which is capable of developing two distinct levels of damping as conditions warrant. While the device has been described as potentially useful in a railcar application, it will be appreciated that damper 10 can be substituted for shock absorbers in other vehicles or non-vehicular applications, as well. Further, this invention presents several features (external and internal fins, convective heat transfer path, specific lubricant, surface treatments) which extend the wearlife of the damper and make the device practical for use.

Various changes, alternatives and modifications will become apparent to one of ordinary skill in the art following a reading of the foregoing specification. It is intended that all such changes, alternatives and modifications as fall within the scope of the appended claims be considered part of the present invention.

I claim:

1. A dual-rate surface effect damper producing a damping force having a hysteretic component and a friction component, said damper comprising:

a) a housing;

b) a rubbing member mounted for relative movement with respect to said housing;

c) a first elastomeric liner section having a first length with a first substantially uniform inner diameter for engagement by said rubbing member to produce a first surface effect damping force;

d) a second elastomeric liner section having a second length with a second smaller substantially uniform inner diameter for engagement by said rubbing member to produce a second larger surface effect damping force.

2. The damper of claim 1 further comprising a third elastomeric liner section intermediate said first and second lengths and having a portion tapering uniformly from a first inner dimension equal to said first inner diameter of said first liner down to a second inner dimension equal to said second inner diameter.

3. The damper of claim 2 wherein the first inner dimension of said third elastomeric liner is adjacent a first end of said third liner and the second inner dimension is adjacent a second opposite end of said third liner.

4. The damper of claim 1 further comprising means to prevent buildup of heat in and around said first, second and third elastomeric liner sections.

5. The damper of claim 4 wherein said means to prevent buildup of heat comprises a plurality of heat dissipative fins on an external surface of said housing.

6. The damper of claim 4 wherein said means to prevent buildup of heat comprises means to permit circulation of air within said rubbing member.

7. The damper of claim 6 wherein said means to permit circulation of air comprises an insert provided with a plurality of axial bores within a first end portion of said rubbing member and vent passageways provided in an opposite end portion of said rubbing member, said insert enhancing conductive and convective heat transfer.

8. The damper of claim 6 wherein said means to permit circulation of air comprises a longitudinal baffle provided within said rubbing member, said rubbing member having a generally tubular configuration, a first opening on a first side of said baffle in said tubular rubbing member permitting influx of air and a second opening on a second side of said baffle permitting egress of air.

9. The damper of claim 8 wherein said means to prevent buildup of heat further comprises at least one fin within said tubular rubbing member for conductive and convective heat transfer.

10. The damper of claim 4 wherein said means to prevent heat buildup comprises a lubricant controlling friction developed between rubbing and said elastomeric liner sections.

11. The damper of claim 10 wherein said lubricant comprises an amount of molybdenum disulfide dispersed in flurosilicone grease filled with Teflon ® particles.

12. The damper of claim 4 wherein said means to prevent heat buildup comprises a lubricious surface finish on said rubbing member which minimizes friction-induced abrasion.

13. The damper of claim 12 wherein the lubricious surface finish on said rubbing member is contributed to by a coating.

14. The damper of claim 13 wherein said coating is a Teflon ® resin.

15. A process for increasing the wearlife of an elastomeric damper element in a damper assembly, wherein said elastomeric element is subject to abrasion by a rubbing member, said process comprising:

a) equipping some portion of said damper assembly with heat dissipative elements;

b) surface treating said rubbing member to decrease its tendency to abraid said elastomeric damper element;

c) lubricating a surface portion of said damper element with a silicone grease, in which is dispersed a small amount of molybdenum disulfide, in order to effectively control any heat buildup in said damper assembly and maintain a temperature of said elastomeric damper element below a particular critical temperature above which thermal breakdown of said elastomeric damping element occurs.

16. The process of claim 15 wherein the step of maintaining the temperature of said elastomeric damping element below a critical temperature comprises the step of maintaining said damping element temperature below 200° F. (93.3° C.).

17. The process of claim 15 wherein the step of surface treating said rubbing member includes the step of coating said rubbing member with a highly lubricious coating.

* * * * *